2 Sheets--Sheet 2.

B. KING.
Corn-Planter.

No. 169,176.

Patented Oct. 26, 1875.

Witnesses:
H. W. Johnson.
H. M. Jamieson.

Inventor:
Benjamin King.
his mark.

UNITED STATES PATENT OFFICE.

BENJAMIN KING, OF JONESBURG, MISSOURI.

IMPROVEMENT IN CORN-PLANTERS.

Specification forming part of Letters Patent No. 169,176, dated October 26, 1875; application filed March 11, 1875.

*To all whom it may concern:*

Be it known that I, BENJAMIN KING, of Jonesburg, in the county of Montgomery and State of Missouri, have invented a new and useful Improvement in Corn-Planters, which improvement is fully set forth in the following specification, reference being had to the accompanying drawings, in which—

Figure 1:
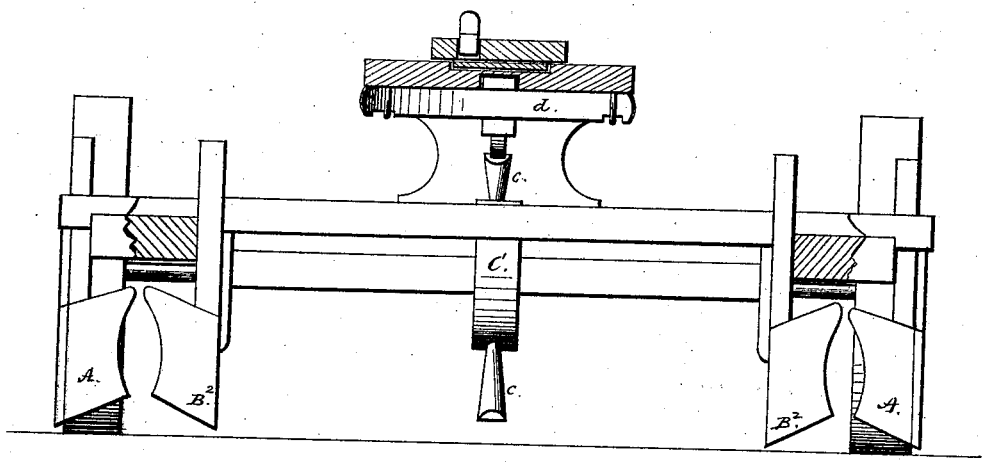
Figure 2:
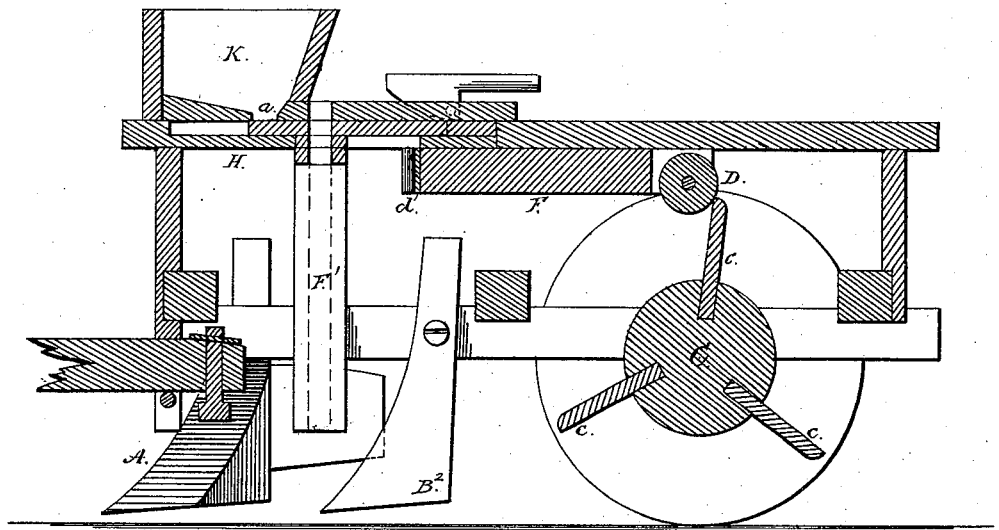
Figure 3:
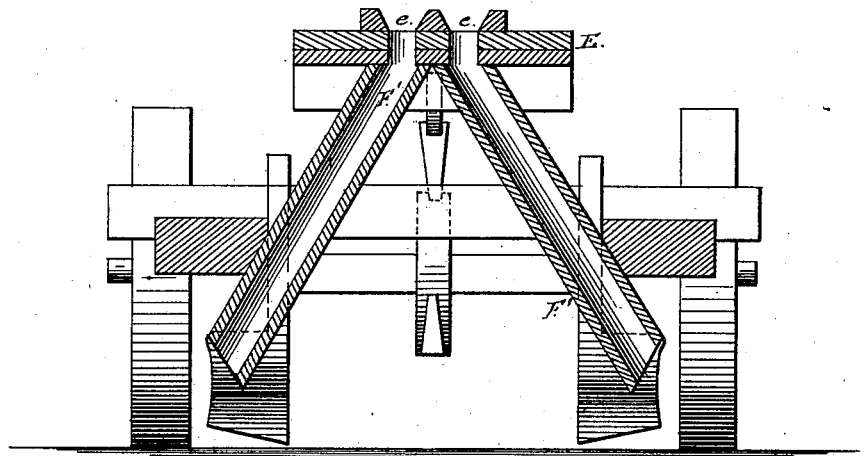

Figure 1 is a vertical cross-section of the machine; Fig. 2, a longitudinal vertical section; Fig. 3, a transverse vertical section, in rear of the hopper, through the seed-spouts.

My invention relates to that class of machines in which two rows of corn are planted at the same time; and consists in the combination of a single hopper or seed-box, a reciprocating feed device, and operating mechanism for delivering the kernels of corn into two converging spouts, which discharge it into two parallel furrows, and two sets of plows for forming the furrows and covering the same after the corn is discharged therein, all as hereinafter more fully described.

A A in the drawings are two plows secured to the front frame of the machine, and which form the two parallel furrows in which the corn is to be planted. K is the hopper or seed-box, arranged on top and over the front center of the machine, and is provided with an opening, $a$, in the bottom thereof, through which the kernels of corn are delivered into two openings, $e\ e$, in a reciprocating slide, E, when said slide is moved forward, so that the openings therein come under the opening in the hopper. This slide is moved forward by the arms $c$ on the revolving wheel C, which come successively in contact with an anti-friction roller, D, on the rear end of the slide E, and the slide is returned to its original position by a spring, $d$, as soon as it is released from contact with one of the arms $c$ on the wheel, which brings the openings $e\ e$ directly over the mouths of the two converging spouts $F'\ F'$, and into which the kernels of corn pass, and are discharged therefrom into the two furrows just back of the two plows which form the furrows. The furrows are then covered by two plows, $B^2\ B^2$, secured to the frame of the machine just in rear of the discharge-openings in the converging spouts, as clearly shown in the drawings. The kernels of corn are prevented from falling through the openings in the slide until they come over the mouths of the two converging spouts by a bottom board, H, in close proximity to and over which the slide moves. The distance apart of the hills of corn to be planted is regulated by increasing or decreasing the number of arms $c$ upon the wheel C, which operate the slide.

The operation of the machine is obvious from the foregoing description. The wheel C, being secured to the axle, is operated through the medium of the traction-wheels upon which the machine is mounted.

I am aware that machines are common in this class having two hoppers, each being provided with a reciprocating feeding device for planting two rows of corn, and also a single hopper divided into compartments for the reception of different kinds of seed with converging spouts, and such I do not desire to claim broadly as my invention; but What I do claim is—

The combination, in a corn-planter, of the hopper or seed-box K, reciprocating feed-slide E, having two openings, $e\ e$, spring $d$, and driving mechanism, converging discharge-spouts $F'\ F'$, and plows A A and $B^2\ B^2$, the several parts being constructed and arranged to operate substantially in the manner herein shown and described.

BENJAMIN  ×  KING.
his / mark.

Witnesses:
C. M. HINES,
J. M. WILSON.